United States Patent [19]
Tseng

[11] Patent Number: 6,113,696
[45] Date of Patent: Sep. 5, 2000

[54] ADAPTABLE FILAMENT DEPOSITION SYSTEM AND METHOD FOR FREEFORM FABRICATION OF THREE-DIMENSIONAL OBJECTS

[75] Inventor: Ampere A. Tseng, Phoenix, Ariz.

[73] Assignee: Arizona State University, Tempe, Ariz.

[21] Appl. No.: 09/086,164

[22] Filed: May 28, 1998

[51] Int. Cl.[7] ................................................. B05C 11/00
[52] U.S. Cl. ..................... 118/696; 118/313; 156/167; 156/180; 156/244.11; 156/500
[58] Field of Search ................................ 118/300, 305, 118/313, 696; 156/166, 167, 180, 244.11, 500

[56] References Cited

U.S. PATENT DOCUMENTS

| | | | |
|---|---|---|---|
| 3,046,178 | 7/1962 | Tupper | 156/167 |
| 4,247,508 | 1/1981 | Householder | 264/219 |

OTHER PUBLICATIONS

J.J. Beaman, J.W. Barlow, D.L. Bourell, R.H. Crawford, H.L. Marcus and K.P. McAlea, "Solid Freeform Fabrication: A New Direction in Manufacturing," ch. 2(Kluwer Academic, Norwell, MA, 1997).

P.F. Jacobs, Rapid Prototyping & Manufacturing Fundamentals of Stereolithography, pp. 406–409 (Society of Manufacturing Engineering, Dearborn, MI, 1992).

*Primary Examiner*—James Sells
*Attorney, Agent, or Firm*—Baker Botts L.L.P.

[57] ABSTRACT

An improved system for forming a three-dimensional object by filament deposition of forming materials includes a crucible for holding a reservoir of the filament forming material, an orifice disposed in the bottom of the crucible through which the forming material passes to form a flow of material filaments, and a flow control apparatus for controlling and selectively depositing the flow of material filaments on the substrate exclusively where required to form the three-dimensional object. In a preferred embodiment, the forming material is ejected from the crucible as a variable-diameter circular liquid jet, which cools to form variable-diameter filaments of semi-molten forming materials.

6 Claims, 6 Drawing Sheets

ADAPTABLE FILAMENT DEPOSITION SYSTEM AND METHOD FOR FREEFORM FABRICATION OF THREE-DIMENSIONAL OBJECTS

BACKGROUND OF THE INVENTION

Freeform fabrication techniques are particularly useful for reducing the design, production and maintenance cycle times associated with the manufacture of three-dimensional objects. In the design phase, freeform fabrication techniques are especially useful for refining prototyping designs, investigating inconsistencies in designs, and modifying designs prior to full-scale production. In addition, freeform fabrication techniques have been shown to yield higher quality products at lower cost.

However, the need presently exists for improved freeform fabrication techniques capable of producing complex structures at lower cost with minimum set-up and run-times. Although widely known, conventional freeform fabrication techniques remain mostly inadequate for low-cost production of complex three-dimensional structures. See e.g. J. J. Beaman, J. W. Barlow, D. L. Bourell, R. H. Crawford, H. L. Marcus and K. P. McAlea, "*Solid Freeform Fabrication: A New Direction in Manufacturing*," ch. 2 (Kluwer Academic, Norwell, Mass., 1997).

One such technology, wire-like filament deposition, has emerged as a popular freeform fabrication technology for forming three-dimensional solid components. The most widely known filament deposition system is the Fused Deposition Modeling ("FDM") system developed by Stratasys, Inc. See P. F. Jacobs, *Rapid Prototyping & Manufacturing Fundamentals of Stereolithography*, pp. 406–409 (Society of Manufacturing Engineering, Dearborn, Mich., 1992). The FDM system deposits a continuous filament of a thermoplastic polymer or wax through a resistively heated, x-y position controlled nozzle or delivery head. The material is heated just above its melting temperature and then deposited into thin layers, on a layer-by-layer basis, on top of a fixture-less base. As the object is built upwards on the base, the thermoplastic or wax material solidifies in place to form the desired three-dimensional components.

However, because of the fixed-size head, the manufacturing and prototyping capabilities of the FDM system is severely limited due to the size of the extruded filaments. At best, the filaments are limited to a relatively small range of sizes and thus the total mass flow rate of the filament deposition is severely limited. As such, the FDM system is inadequate for large-scale manufacturing and complex rapid prototyping.

Therefore, a principal object of the present invention is to provide a system for producing variable-diameter filaments of forming materials that can be efficiently and accurately deposited on a substrate based on the specific outline geometry and internal micro-structure of the three-dimensional object to be formed.

Another object of the present invention is to provide a system for forming three-dimensional objects wherein variable-diameter filaments of forming materials are selectively deposited in an incremental manner on a position controllable substrate.

Still another object of the present invention is to provide a system for manufacturing high quality three-dimensional objects at low cost with minimum setup and run-times.

Further objects, features and advantages of the invention will become apparent from the following detailed description taken in conjunction with the accompanying figures showing illustrative embodiments of the invention.

SUMMARY OF THE INVENTION

The present invention relates to a filament deposition system for manufacturing three-dimensional objects by selectively depositing material filaments on a position controllable substrate. In accordance with a preferred embodiment of the present invention, the filament deposition system includes a crucible for holding a reservoir of filament forming material, an orifice disposed in the bottom of the crucible through which the forming material passes to form a flow of material filaments, and a flow control apparatus for controlling and selectively depositing the flow of material filaments on the substrate exclusively where required to form the three-dimensional object.

Advantageously, the filament deposition system includes a flow control apparatus for depositing material filaments only where required by the outline geometry and desired internal micro-structure of the three-dimensional object to be formed. Preferably, the deposition control apparatus includes a position controllable mechanical member coupled to a position control device for varying the effective diameter of the material filaments and for selectively depositing the material filaments onto the substrate.

In accordance with another aspect of the present invention, a method is disclosed for forming a three-dimensional object by deposition of filament forming material on a substrate. The method includes the steps of loading a reservoir of the forming material in a container, heating the container to melt the forming material contained therein, ejecting the molten forming material from the container through an opening formed therein, adjusting the effective size of the opening to form a variable-size flow of molten forming material towards the substrate, cooling the variable-size flow to form variable-size material filaments flowing towards the substrate, positioning the substrate beneath the material filaments, and depositing the material filaments in layers on the substrate to form the three-dimensional object.

BRIEF DESCRIPTION OF THE DRAWINGS

For a complete understanding of the present invention and the advantages thereof, reference is now made to the following description taken in conjunction with the accompanying drawings in which like reference numbers indicate like features and wherein.

Figure 1:
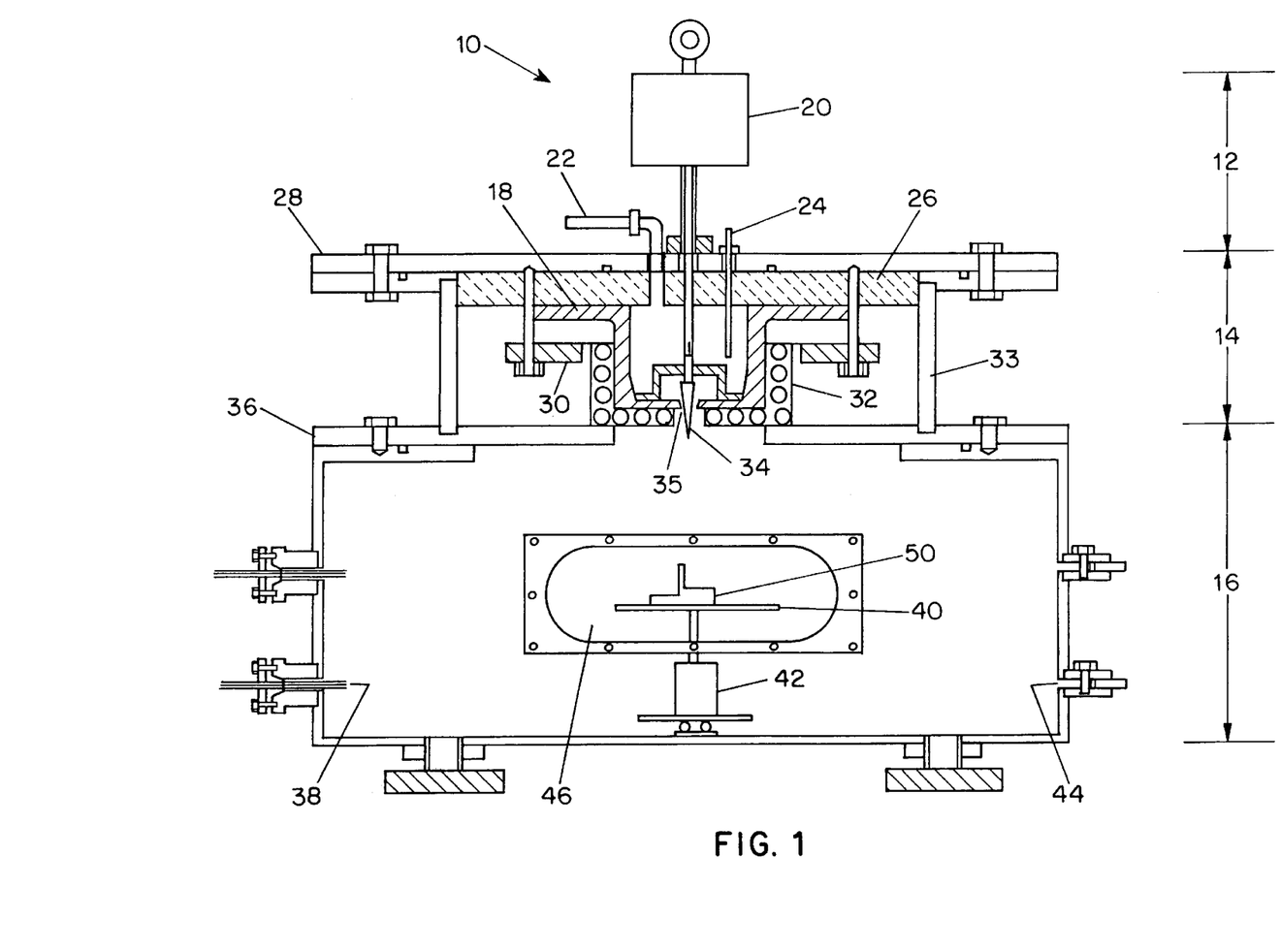
FIG. 1 is a partial sectional view of a filament deposition system according to a preferred embodiment of the present invention.

DETAILED DESCRIPTION OF THE INVENTION:

FIG. 1 illustrates a filament deposition system 10 for forming a three-dimensional object, or "workpiece," 50 on a position controllable substrate 40. The filament deposition system 10 is a modified version of the circular jet drop deposition apparatus described by Tseng et al. in U.S. application Ser. No. 09/010,923.

The filament deposition system 10 includes a crucible assembly 14, a deposition control assembly 12, and an environmentally-controlled deposition chamber 16. The crucible assembly 14 includes a crucible 18 for holding and liquefying a forming material such as metal or ceramic powder slurry. The material comprising the crucible 18 itself depends on the specific end-use application, but is typically a high-temperature metal alloy or ceramic. For example, a stainless steel crucible can be heated up to 1000° C. and thus is ideal for melting aluminum-based alloys. For making metal parts with even higher melting temperatures, the crucible can be made of either ceramics or ceramic-matrix composites.

The crucible 18 is mounted on an annular support structure 30, which itself is mounted within a heating chamber 33, and is covered by a ceramic plate 26 and a crucible cover 28. The heating chamber 33 includes a resistance or induction heater element 32 for melting the forming material contained therein. A temperature sensor 24 is provided within the crucible 18 for monitoring the temperature of the molten material. The crucible 18 is arranged and constructed to hold a wide variety of alloys and ceramic powder materials, including but not limited to, iron, stainless steel, nickel, tungsten, carbides, alumina, mullite, and zirconia.

The crucible assembly 14 further includes a conical nozzle orifice 35 disposed in the bottom of the crucible 18 through which the molten forming material flows into the deposition chamber 16. An external pressure source is provided via external piping 22 for applying a back-pressure to the molten forming material. The external pressure source is operated to create a pressure differential, nominally 5 to 500 kPa, between the inside of the crucible and the outside of the nozzle orifice 35, thus enhancing the flow of the molten forming material through the nozzle orifice 35. Preferably, the external pressure is provided by a non-reactive pressurized gas such as nitrogen or helium to prevent oxidation.

Figure 2:
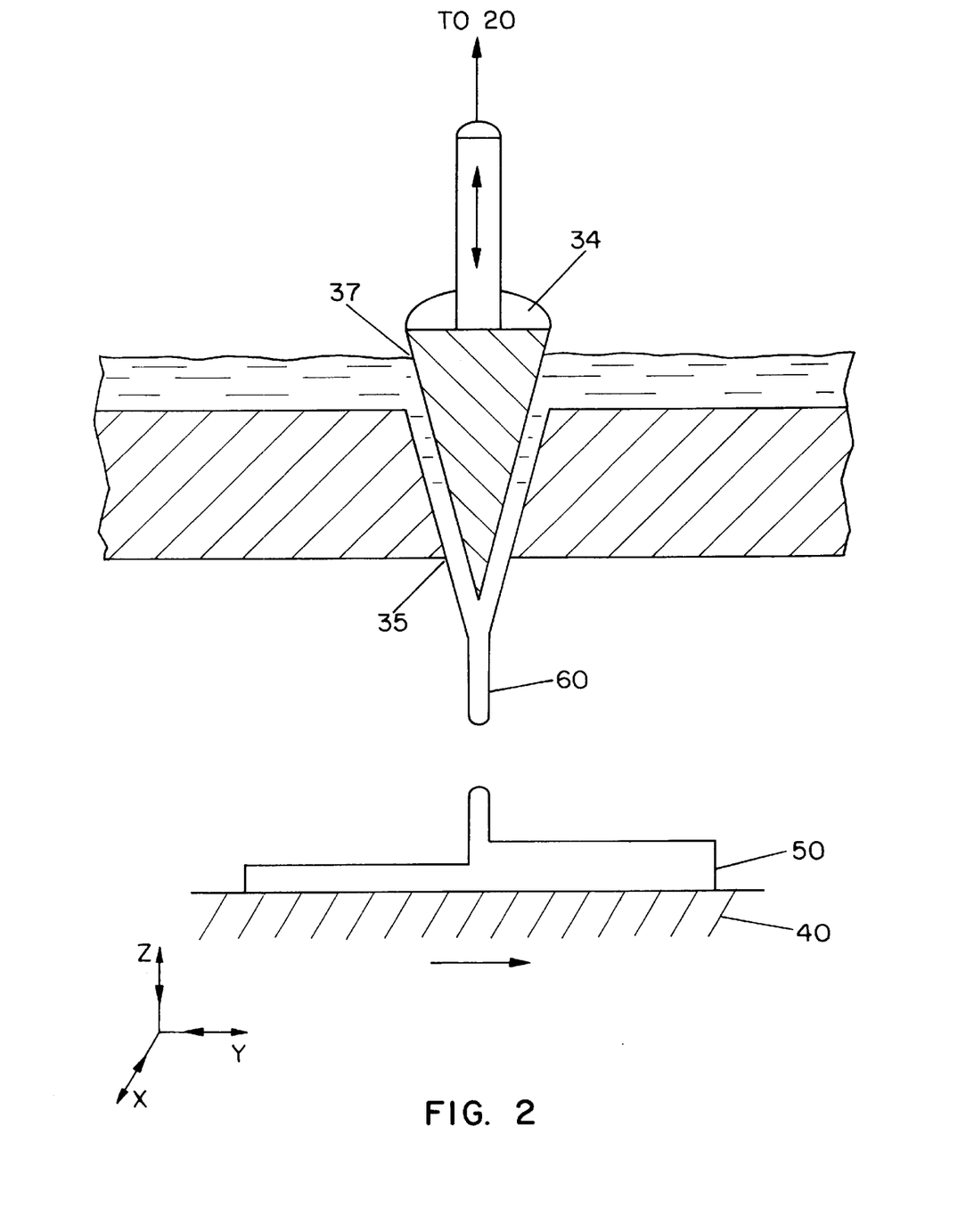
FIG. 2 is a sectional view of a flow control apparatus for use with the filament deposition system of FIG. 1.

The control section 12 includes a flow control apparatus 20 coupled to a position controllable spindle 34. As shown in FIG. 2, the spindle 34 has a cone shaped head 37 which cooperates with the matching conical nozzle orifice 35 to form variable-diameter filaments 60 of semi-molten forming material flowing from the crucible 18. Variation in the diameter of the filaments is obtained by varying the vertical position of the spindle 34 with respect to the nozzle orifice 35. When the conical head 37 of spindle 34 is completely withdrawn from the nozzle orifice 35, there is no flow constriction and the effective diameter of the nozzle orifice 35 is the actual diameter of the orifice itself. When the conical spindle head 37 is lowered into the nozzle orifice 35, the effective flow area is reduced and the flow exiting the orifice follows the contour of the conical spindle head. By controlling the vertical positioning of the spindle head 37, the effective diameter of the nozzle orifice 35 can be varied to form material filaments having a wide range of sizes.

By properly positioning the spindle 34 in a downward direction towards the conical nozzle orifice 35, the effective diameter of the material filaments can be varied by a factor of five. This corresponds to a factor of 25 change in the cross-sectional area and hence mass flux of the material filaments.

Flow of molten material is completely impeded or "shut-off" when no material is required by lowering the spindle head 37 until it seats in the mating orifice 35. Accordingly, it is possible to deposit forming material only where required by the specific outline geometry of the three-dimensional object to be formed. To control the vertical positioning of the spindle 34, control apparatus 20 includes an electronically controlled motor drive and is coupled to a microprocessor that uses a process model or slicing algorithm to determine exactly the required filament diameter and where the individual filaments are to be deposited. Consequently, only the desired filaments are generated and waste is eliminated.

Referring again to FIG. 1, the deposition chamber 16 includes a flange adapter 36 for mating with the heating chamber 33, wiring leads 38, a view port 46, and a position controllable platform 42 for supporting a substrate 40 on which the material filaments are deposited. Vacuum/gas lines 44 are also provided for maintaining the deposition chamber 16 under a vacuum or within a non-reactive environment filled with either nitrogen or helium.

Deposition of the semi-molten filaments is made possible by the cooling of the forming material within the deposition chamber 16 after the material exits the nozzle orifice 35. In the environmentally-controlled deposition chamber 16, the semi-molten filament is cooled down by the ambient gas, either nitrogen or helium, by convection or radiation to the ambient objects. Since the size of material filaments is relatively small, in the range typically from 50 $\mu$m to 2 mm, the material filaments can be cooled down very rapidly. Within the deposition chamber 16 (FIG. 1), the molten forming material thus undergoes just the right amount of cooling such that the material is in a semi-molten state when deposited.

As such, the disclosed technique is analogous to squeezing toothpaste from a tube and depositing it onto a toothbrush. With the appropriate controls, semi-molten filaments are deposited onto a substrate to form the desired three-dimensional object 50. Since the temperature of the substrate is relatively low, the material filaments will completely solidify on the substrate or the previously deposited layer.

Although FIG. 1 shows only one crucible 18 for providing forming materials, usually two forming materials are needed, e g., a "building" material for building the desired workpiece and a "supporting" material for supporting the building material during formation of the workpiece. A supporting material, for example, can be used to provide a supporting structure while forming an overhang metal structure. A typical building material can be, for example, a relatively high-melting-temperature metal, and a typical supporting material can be a low-melting-temperature wax or oligomeric hydrocarbon material. The supporting material typically has a melting temperature lower than the melting temperature of the building material such that it can be selectively removed by melting after completion of the deposition process. Consequently, a plurality of crucibles and/or corresponding spindles and nozzle orifices can be arranged as required to deposit the corresponding number of forming materials.

If only one forming material can be accommodated, the supporting structure can be built using the same material as the building material, but is built such that the supporting structure can be easily removed. For example, the supporting structure can be built to be much weaker than the object structure so that it can be easily removed by manual means.

Figure 3:
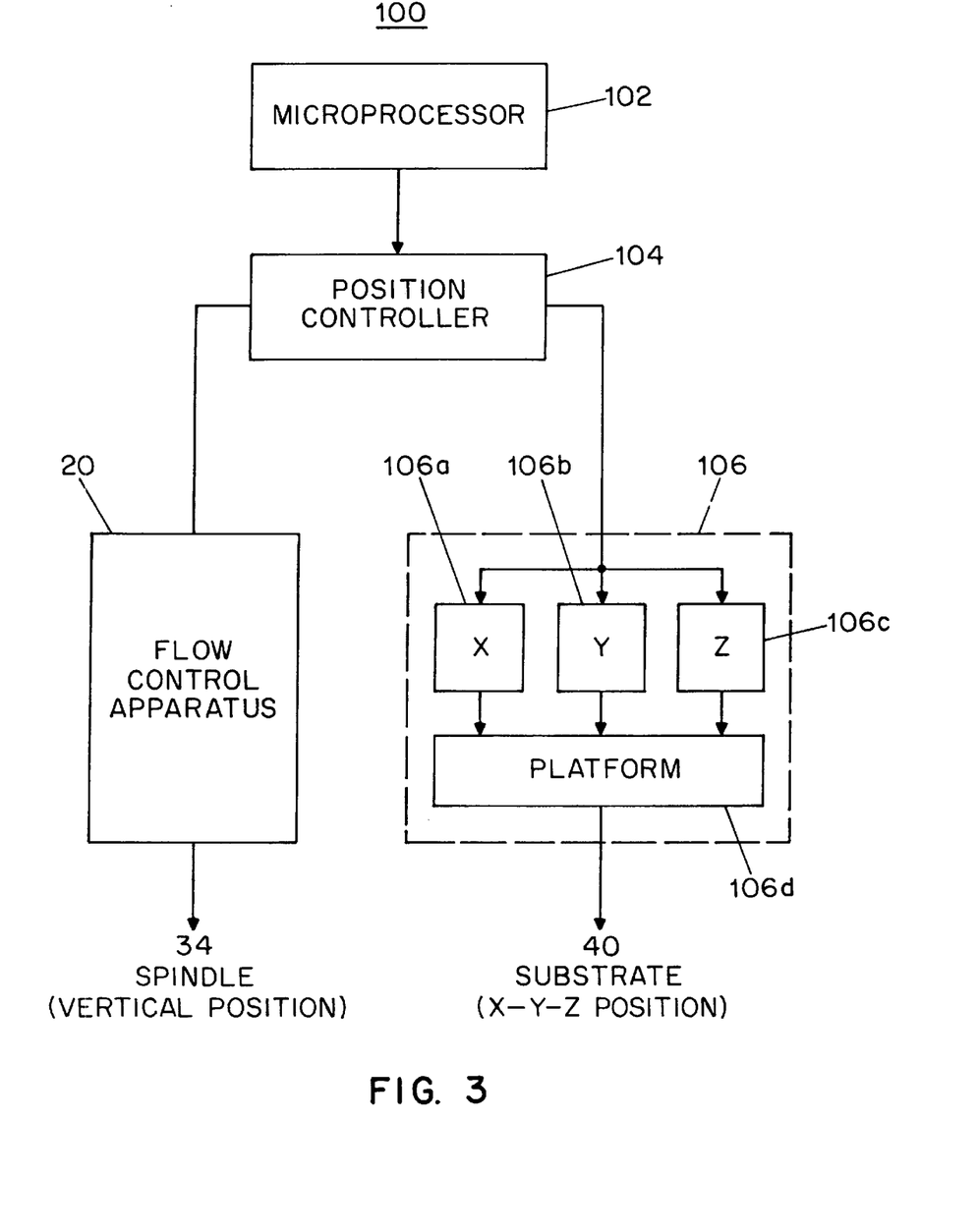
FIG. 3 is a schematic representation of a control system for use with the filament deposition system of FIG. 1.

FIG. 3 is a schematic representation of a control system 100 for the filament deposition system 10 of FIG. 1. The control system 100 includes a programmable microprocessor 102 for issuing positioning instructions to a position controller 104. The position controller 104 in turn issues control signals to a position controllable platform 106, which includes a substrate supporting platform 106d and X, Y and Z coordinate motors 106a, 106b and 106c, respectively, which are used to position the substrate 40 beneath the material filaments flowing from the nozzle orifice 35. The position controller 104 also issues control signals to the flow control apparatus 20 for varying the vertical position of the conical spindle 34 with respect to the matching nozzle orifice 35 (in FIG. 1 or 2).

The position controllable platform 106 of the present embodiment is capable of translating in all three Cartesian axes with an accuracy on the order of one micrometer. An RS-232 interface (not shown) is used to connect the microprocessor 102 to the position controller 104. Preferably, instructions from the microprocessor 102 to the position controller 104 are provided in computer-aided design ("CAD") type formats and generated by a computer program that accepts geometric data representing the workpiece to be formed, and which slices the data into appropriate layers. The position controller 104 then generates the appropriate control signals for positioning the substrate 40 and for varying the vertical position of the spindle 34 with respect to the nozzle orifice 35.

As such, the completed workpiece 50 is formed incrementally by building layers from the bottom up in sequential order. This is accomplished by properly controlling the X, Y and Z position coordinates of the substrate supporting platform 106d. The system is highly flexible in that a multitude of computer programs can be used to an design and store data representing the objects to be formed. In addition, designs can be transmitted electronically to the system thus allowing remote operation and resource networking.

Figure 4:
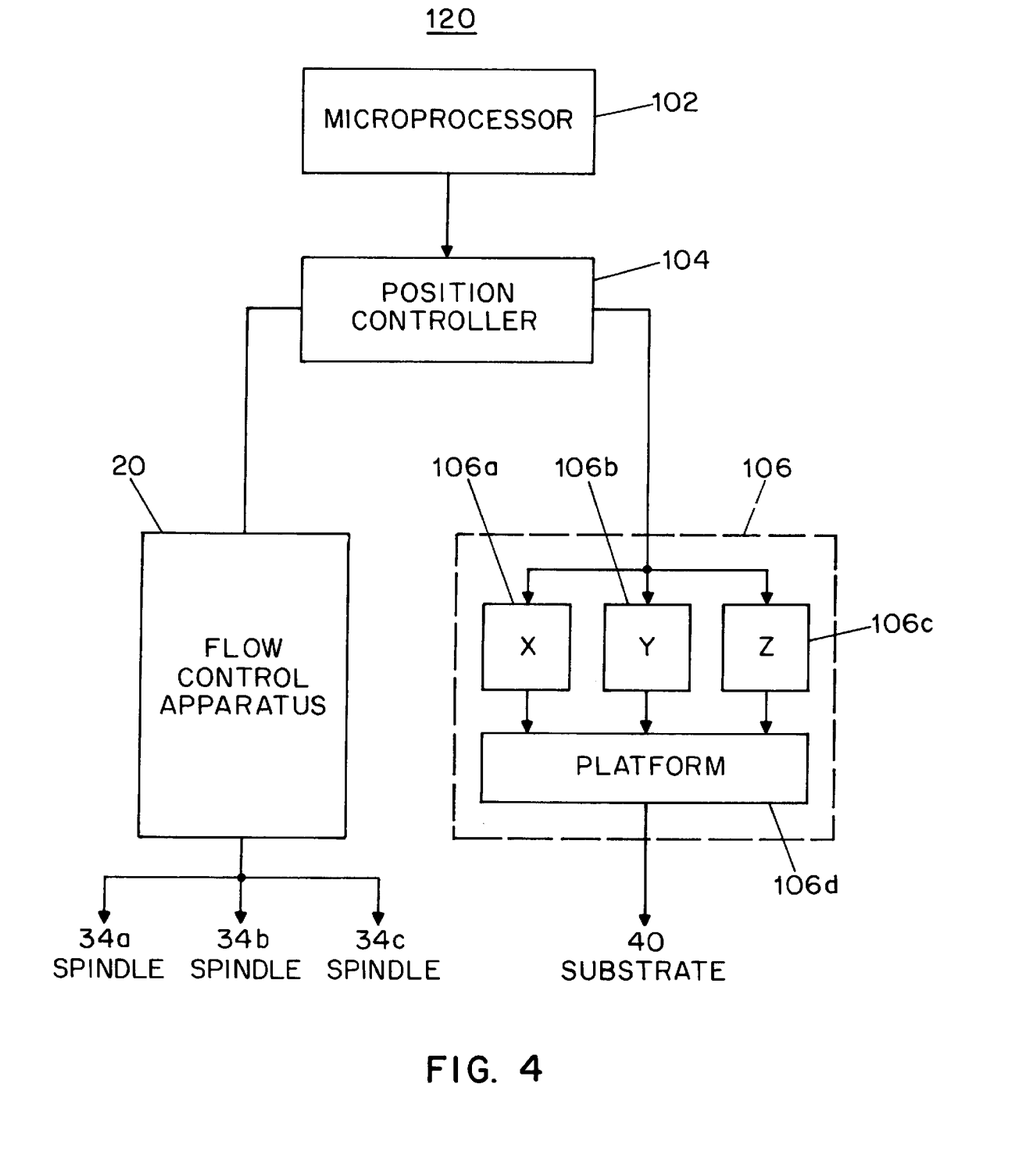
FIG. 4 is a schematic representation of a control system for use with a filament deposition system having a plurality of spindle/nozzle pairs.

The control system 100 of FIG. 3 can be further adapted to control a filament deposition system having a plurality of nozzle orifices and spindle pairs corresponding to the number of forming materials being used to form the three-dimensional object. For example, as shown in FIG. 4, a control system 120 similar to the control system of FIG. 3 can be used to separately control spindles 34a through 34c.

Figure 5:
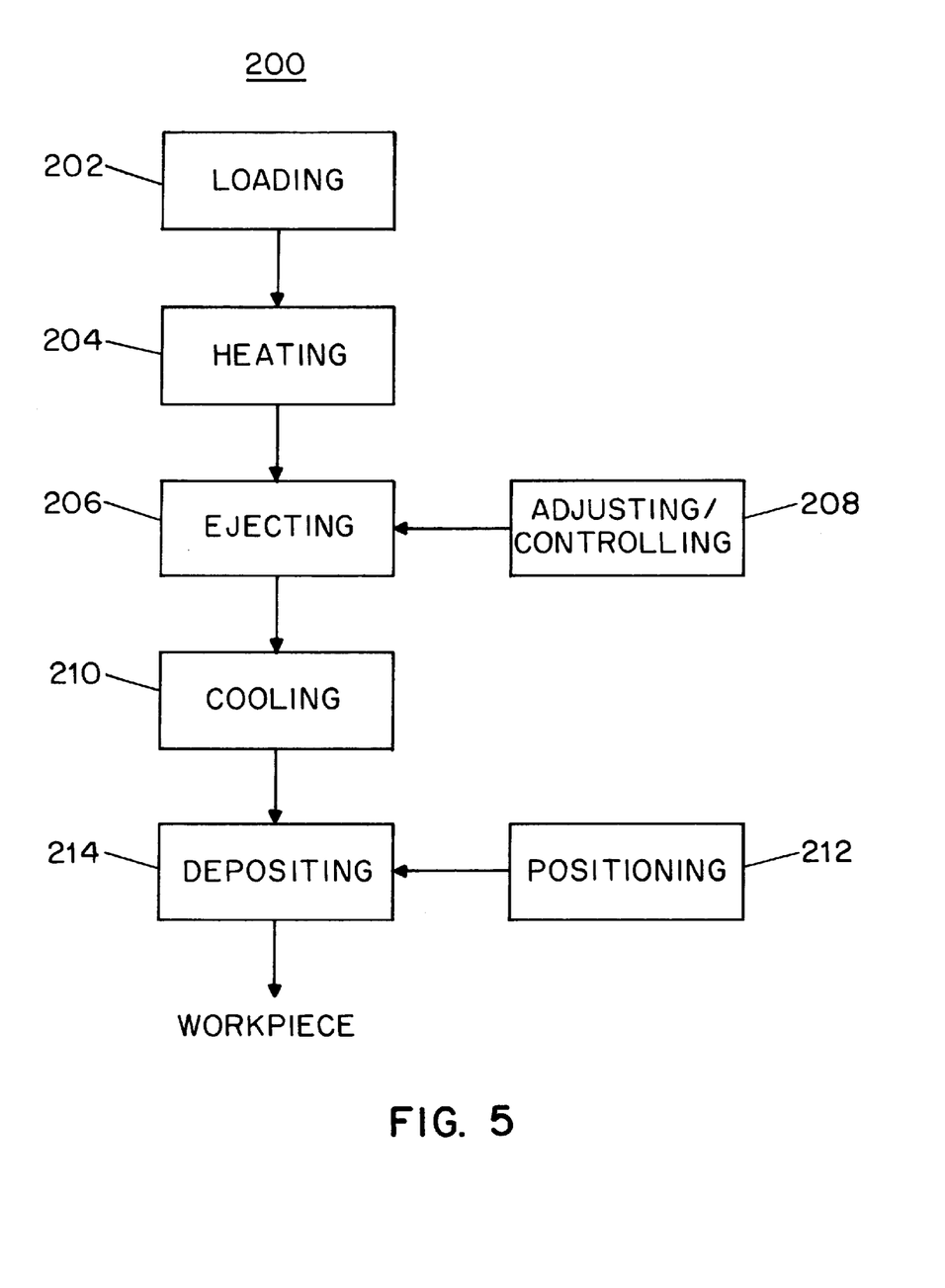
FIG. 5 is a flow diagram of a method for depositing variable-size filaments of semi-molten forming materials on a position controllable substrate to form a three-dimensional object.

FIG. 5 is a flow diagram of a preferred method 200 for depositing filaments of semi-molten forming material, eg., ceramic/polymer slurry or metal, on a position controllable substrate to form a desired three-dimensional object. According to the present invention, the method 200 includes the steps of loading a reservoir of forming material in a container (Step 202), heating the container to melt the forming material contained therein (Step 204), and ejecting the molten forming material from the container through an opening (Step 206). In conjunction with the ejecting step, the method includes the step of adjusting the effective size, e g., diameter, of the opening (Step 208), as shown in FIG. 2, to form a variable-diameter jet of molten forming material flowing towards the substrate. The method further includes cooling the variable-diameter circular jet to form variable-diameter filaments of forming materials (Step 210), and depositing the material filaments in layers on the substrate as the position of the substrate is varied (212) to form the three-dimensional object (Step 214).

Figure 6:
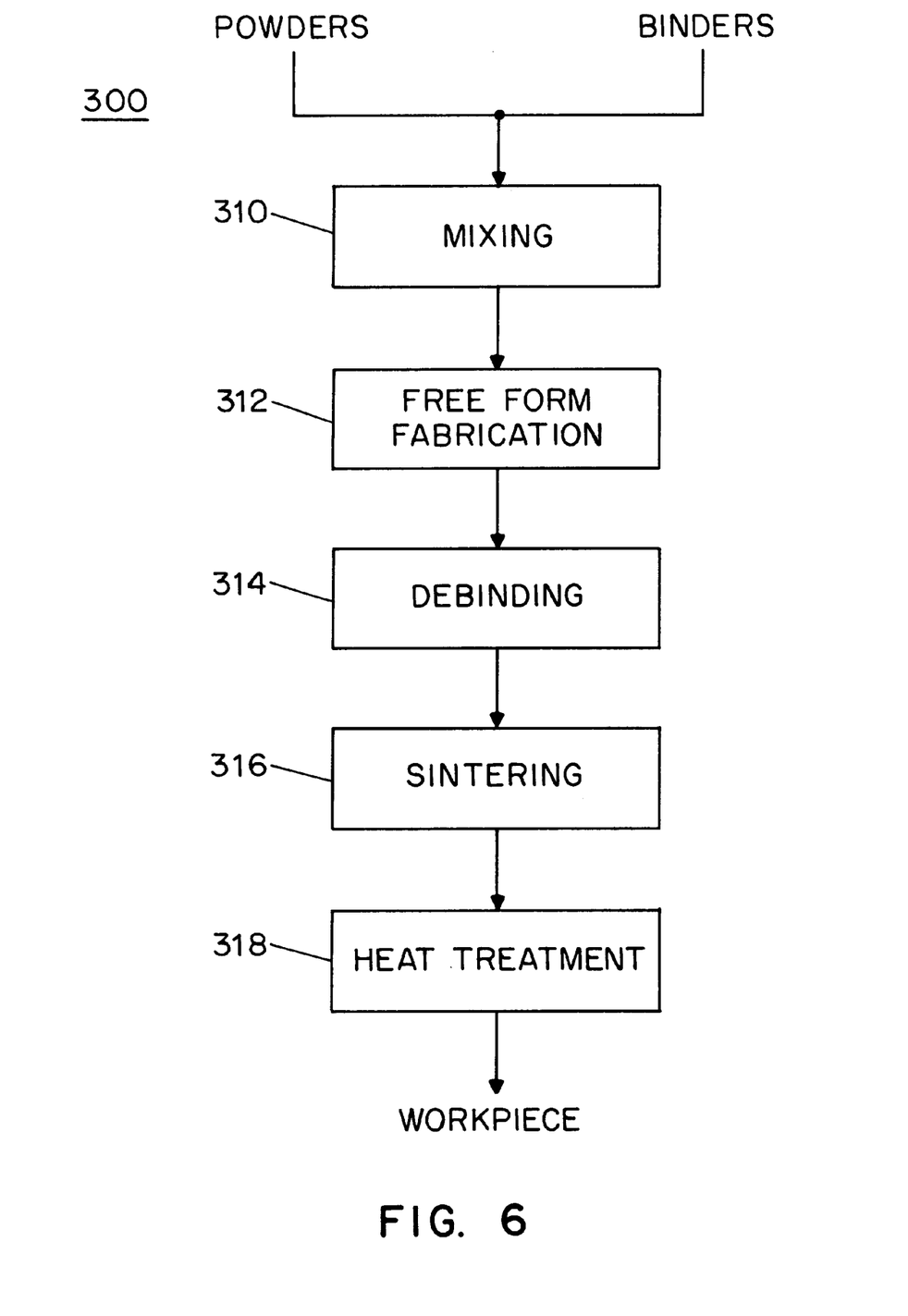
FIG. 6 is a flow diagram of a method for forming powdered metal and ceramic three-dimensional objects.

FIG. 6 is a flow diagram of a method 300 for forming powdered metal and ceramic three-dimensional objects according to another preferred method of the present invention. In addition to the steps shown in FIG. 5 (Step 312 in FIG. 6), the method 300 of FIG. 6 includes critical pre- and post- processing steps (Steps 310 and 314 through 318) required for forming metal or ceramic powder workpieces.

When forming metal or ceramic powder workpieces, pre-processing of the powder material must be performed in order to make the powder material suitable for flowing through the corresponding container openings, i.e., a conical orifice. A powder slurry is formed for this purpose, and is done so by mixing a metal or ceramic powder with a polymeric binder and other additives in a high shear mixer (Step 310). The binder can be either an aqueous or non-aqueous binder such as a polymer or wax. Suitable additives include, but are not limited to, viscosity modifiers, dispersants, flocculate, and lubricants.

As further shown in FIG. 6, the powder/binder mixture is then loaded into a crucible, heated and ejected through the container opening so as to form a "green preform" on the position controllable substrate (Step 312). Depending upon the rheological response of the powder/binder mixture, an ejecting pressure within the range of 5 to 100 psi (35 to 700 kPa) is required to form the powder/binder plastic objects. Preferably, the "green preform" has a sufficient "wet" strength such that is resists deformation due to its own weight and handling stresses.

After the "green preform" is deposited on the substrate, the deposited material is post-processed as indicated by Steps 314 through 318. As shown in FIG. 6, post-processing includes the step of de-binding the metal or ceramic powder workpiece to remove the binder (Step 314), and sintering to bond the powders that form the three-dimensional object (Step 316). In addition, post processing may include additional heat treatment of the sintered three-dimensional object (Step 318).

In summary, the filament deposition system and method of the present invention can be used to produce high quality and complex three-dimensional objects much more efficiently than possible with conventional fixed-diameter filament deposition systems. Because variable-diameter filaments are used, the present system and method are characterized by shorter product formation times and thus improved production rates. In addition to freeform fabrication, the present invention is also useful for other end-use applications including rapid solidification research and metal-matrix composite deposition. Moreover, the system and method of the present invention can be used to study how different filament structures influence the process yield, porosity and microstructures of deposited three-dimensional objects.

Although the present invention has been described in connection with particular embodiments thereof, it is to be understood that such embodiments are susceptible of modification and variation without departing from the inventive concept disclosed. All such modifications and variations, therefore, are intended to be included within the spirit and scope of the appended claims.

What is claimed is:

1. In an arrangement for manufacturing a three-dimensional object by deposition of material filaments on a substrate, an assembly for depositing said filaments comprising:

a crucible for holding a reservoir of filament forming material;

an orifice disposed in the bottom of said crucible through which said forming material passes to form a flow of material filaments towards said substrate; and a flow control apparatus for controlling and selectively depositing said flow of material filaments on said substrate exclusively where required to form said three-dimensional object, said flow control apparatus comprising a position controllable mechanical member for varying the effective size of said orifice.

2. The assembly according to claim 1, further comprising:

a position controllable platform for supporting and positioning said substrate along three axes beneath said flow of material filaments;

a programmable microprocessor for issuing positioning instructions to said position controllable platform; and a position controller responsive to said positioning instructions to control the position of said platform.

3. The assembly according to claim 2, wherein said programmable microprocessor also issues positioning instructions to said flow control apparatus and wherein said flow control apparatus is responsive to said flow control apparatus positioning instructions to control the effective size of said orifice.

4. The assembly according to claim 1, further comprising:

a plurality of crucibles for holding different forming materials; and a plurality of orifices disposed in the bottom of each of said crucibles, wherein said flow control apparatus comprises a plurality of position controllable mechanical members corresponding to said orifices for varying the effective size of each of said orifices.

5. The assembly according to claim 4, further comprising:

a position controllable platform for supporting and positioning said substrate along three axes beneath said flow of material filaments;

a programmable microprocessor for issuing positioning instructions to said position controllable platform; and a position controller responsive to said positioning instructions to control the position of said platform.

6. The assembly according to claim 5, wherein said programmable microprocessor also issues positioning instructions to said flow control apparatus and wherein said flow control apparatus is responsive to said flow control apparatus positioning instructions to control the effective size of said orifices.

* * * * *

UNITED STATES PATENT AND TRADEMARK OFFICE
CERTIFICATE OF CORRECTION

PATENT NO. : 6,113,696
DATED : September 5, 2000
INVENTOR(S) : A. Tseng

It is certified that error appears in the above-identified patent and that said Letters Patent is hereby corrected as shown below:

Column 3,
Line 6, "environmentally-controlled" should read -- environmentally controlled --

Column 5,
Line 32, "an" should be deleted
Line 44, "eg.," should read -- e.g., --
Line 54, "e g.," should read -- e.g., --

Column 6,
Line 1, "post- processing" should read -- post-processing --
Line 13, "flocculate" should read -- flocculants --
Line 22, "is" should read -- it --
Line 50, "of" should read -- to --

Signed and Sealed this

Thirteenth Day of November, 2001

Attest:

Nicholas P. Godici

NICHOLAS P. GODICI
Attesting Officer    *Acting Director of the United States Patent and Trademark Office*